(No Model.)
F. SAGER.
BELT TIGHTENER.
No. 292,368. Patented Jan. 22, 1884.
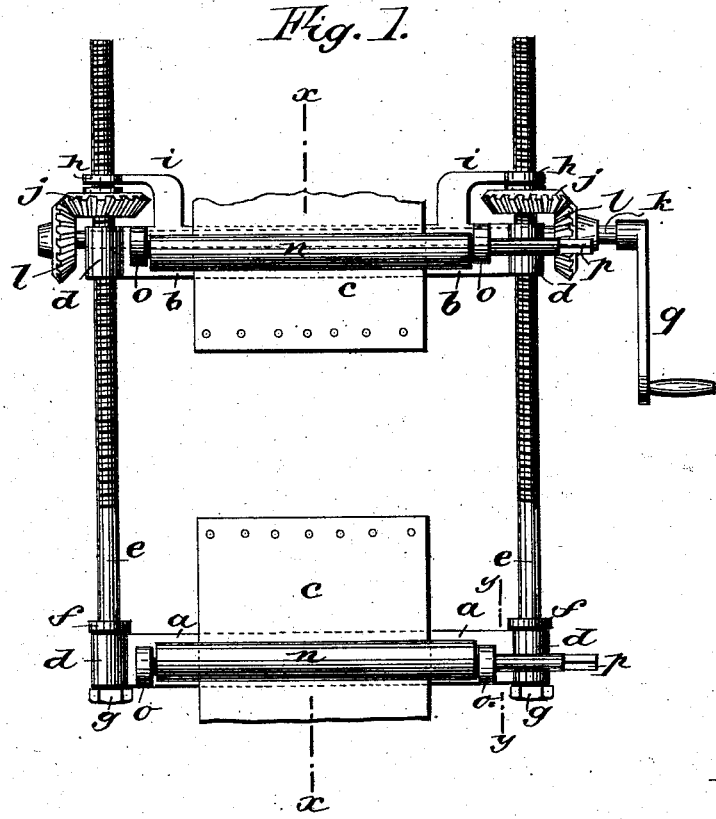
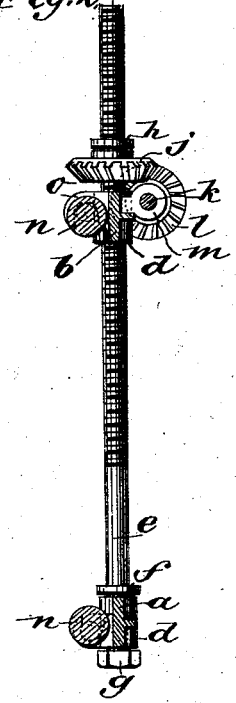
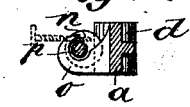
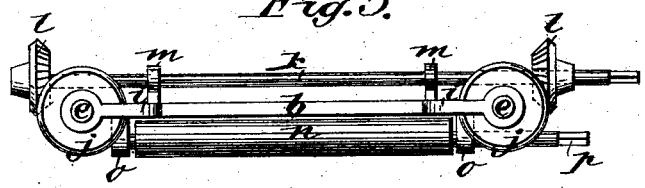
WITNESSES:
INVENTOR:
F. Sager
BY Munn & Co
ATTORNEYS.

UNITED STATES PATENT OFFICE.

FRANK SAGER, OF PITTSBURG, PENNSYLVANIA, ASSIGNOR OF ONE-THIRD TO CHARLES HOLMES, OF SAME PLACE.

BELT-TIGHTENER.

SPECIFICATION forming part of Letters Patent No. 292,368, dated January 22, 1884.

Application filed June 15, 1883. (No model.)

*To all whom it may concern:*

Be it known that I, FRANK SAGER, of Pittsburg, in the county of Allegheny and State of Pennsylvania, have invented a new and Improved Belt-Tightener, of which the following is a full, clear, and exact description.

This invention pertains to an improvement in belt-tighteners; and it consists of the combination and arrangement of parts substantially as hereinafter fully set forth and claimed.

Reference is to be had to the accompanying drawings, forming part of this specification, in which similar letters of reference indicate corresponding parts in all the figures.

Figure 1 is a plan view of my improved belt-tightener. Fig. 2 is a section on the line $x\ x$ of Fig. 1, and Fig. 3 is an end elevation.

I take a couple of head blocks or bars, $a$ and $b$, somewhat longer than the width of the widest belt, $c$, to be tightened, and connect them by eyes $d$ at the ends with screw-threaded rods $e$, which are made fast to bar $a$ by collars $f$ and nuts $g$, but may shift backward and forward along the eyes $d$ of the bar $b$; also along other eyes, $h$, of arms $i$.

Between arms $i$ and bar $d$, I arrange a beveled toothed and screw-threaded nut, $j$, on each rod, which nuts are made to gear with a crank-shaft, $k$, by bevel-wheels $l$, said shaft extending along bar $b$ from end to end, and fitted in bearings $m$ on the back of said bar. By this contrivance of nuts for the rods $e$ geared with the crank-shaft, it will be seen the head blocks or bars may be shifted toward and from each other readily, according as the crank is turned forward or backward.

On each bar $a$ and $b$, I have arranged an eccentric clamping-roller, $n$, in bearings $o$, one of which is open on the side opposite to that on which the stress of the belt pulls, so that said rollers may be taken out of said bearings readily when the tightener is to be removed from the belt after it has been laced. Said rollers $n$ have a shank, $p$, for the application of the crank $q$, to set them for gripping the belt to begin with, after which the stress of the belt will tighten the rollers, the said rollers being set in the first place so that the pull of the belt tightens the rollers. The bearing $o$, having the notch for allowing the rollers to be taken out, will be on that side of the machine where the roller-shanks $p$ are, so that by taking hold of the shank and swinging it out of said notched bearing the journal at the other end of the roller may be pulled out of its bearings. These rollers $n$ are placed on one side of the bars $a$ $b$, and their bearings are so mounted that the shanks $p$ project over and outside of the eyes $d$ suitably for the application of the crank $q$ for tightening up the rollers, and the crank-shaft $k$ is fitted on the opposite side of the bar $b$, to similarly cross the eyes $d$ and the screw-rods, so that for gearing said shaft with the toothed nuts $j$ thereon the teeth of said nuts and of the wheels are cut obliquely to the axes of the said nuts and wheels which are not in the same plane.

If desired, the bearings $o$ may have set-screws to confine the journals of the eccentric rollers in the bearings, as shown in Fig. 4, and both of the bearings of the rollers may be open, if preferred.

Having thus described my invention, what I claim as new, and desire to secure by Letters Patent, is—

In a belt-tightener of that class employing screw-threaded shafts and clamping-rolls, the combination therewith of a fixed and a movable cross-bar having eyes, one at each end, forming bearings for the said shafts, the latter having collars and nuts at the ends of said eyes, and working in screw-threaded bevel-toothed nuts, operated by beveled cog-wheels, a shaft, and a crank or handle, essentially as shown and described, and for the purpose set forth.

FRANK SAGER.

Witnesses:
GRAHAM SCOTT,
ALEX M. BANE.